United States Patent [19]
Brown

[11] 3,915,493
[45] Oct. 28, 1975

[54] SEAT CUSHION RETAINER DEVICE
[75] Inventor: Joseph L. Brown, Mount Clemens, Mich.
[73] Assignee: General Motors Corporation, Detroit, Mich.
[22] Filed: Nov. 21, 1974
[21] Appl. No.: 525,949

[52] U.S. Cl. .................. 296/63; 248/501; 292/87; 292/303; 297/440; 297/452
[51] Int. Cl.² .......................................... B60N 1/00
[58] Field of Search ............. 296/63, 64, 65 R; 9/7; 297/250, 452, 440; 248/188.1, 503, 501; 292/341.17, 303, 80, 87

[56] References Cited
UNITED STATES PATENTS
| | | | |
|---|---|---|---|
| 1,251,976 | 1/1918 | Ledwinka | 296/63 |
| 2,789,621 | 4/1957 | Langtry et al. | 296/63 |
| 3,411,820 | 11/1968 | Brett et al. | 296/63 |
| B386,403 | 1/1975 | Geier | 297/452 |

Primary Examiner—Frank E. Werner
Assistant Examiner—Gary Auton
Attorney, Agent, or Firm—C. Leahy

[57] ABSTRACT

A retainer device for attaching the frame member of a seat cushion to the floor pan of a motor vehicle includes a stamped steel bracket having laterally spaced upstanding legs with which are connected by an integral bridging member. Integral mounting legs of the bracket are attached to the floor pan by bolts. An upwardly opening slot is provided in each of the upstanding legs and these slots are transversely aligned to receive the seat cushion frame member. The upstanding legs have lead-in cam surfaces which guide the frame member into the slots as the seat cushion is lowered onto the bracket. A leaf spring retainer has its one end mounted on the bridging member and its free end poised between the upstanding legs and generally transversely aligned with the upwardly opening slots. When the seat cushion is lowered onto the bracket, the frame member engages the leaf spring retainer to flex the free end of the leaf spring retainer out of transverse alignment with the upwardly opening slots. The leaf spring retainer is self-biased back to its normal poised position in which it is positioned directly above the frame member to prevent upward removal of the frame member. The corners of the free end of the leaf spring retainer are bent downwardly to increase the extent of interference between the leaf spring retainer and the frame member.

1 Claim, 3 Drawing Figures

U.S. Patent  Oct. 28, 1975  3,915,493
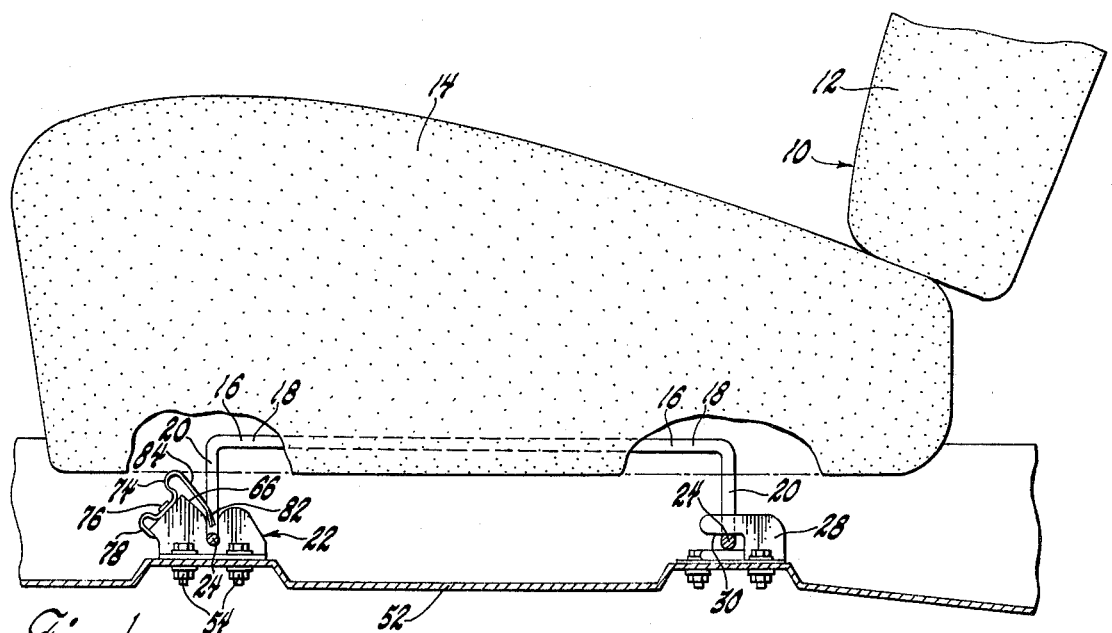
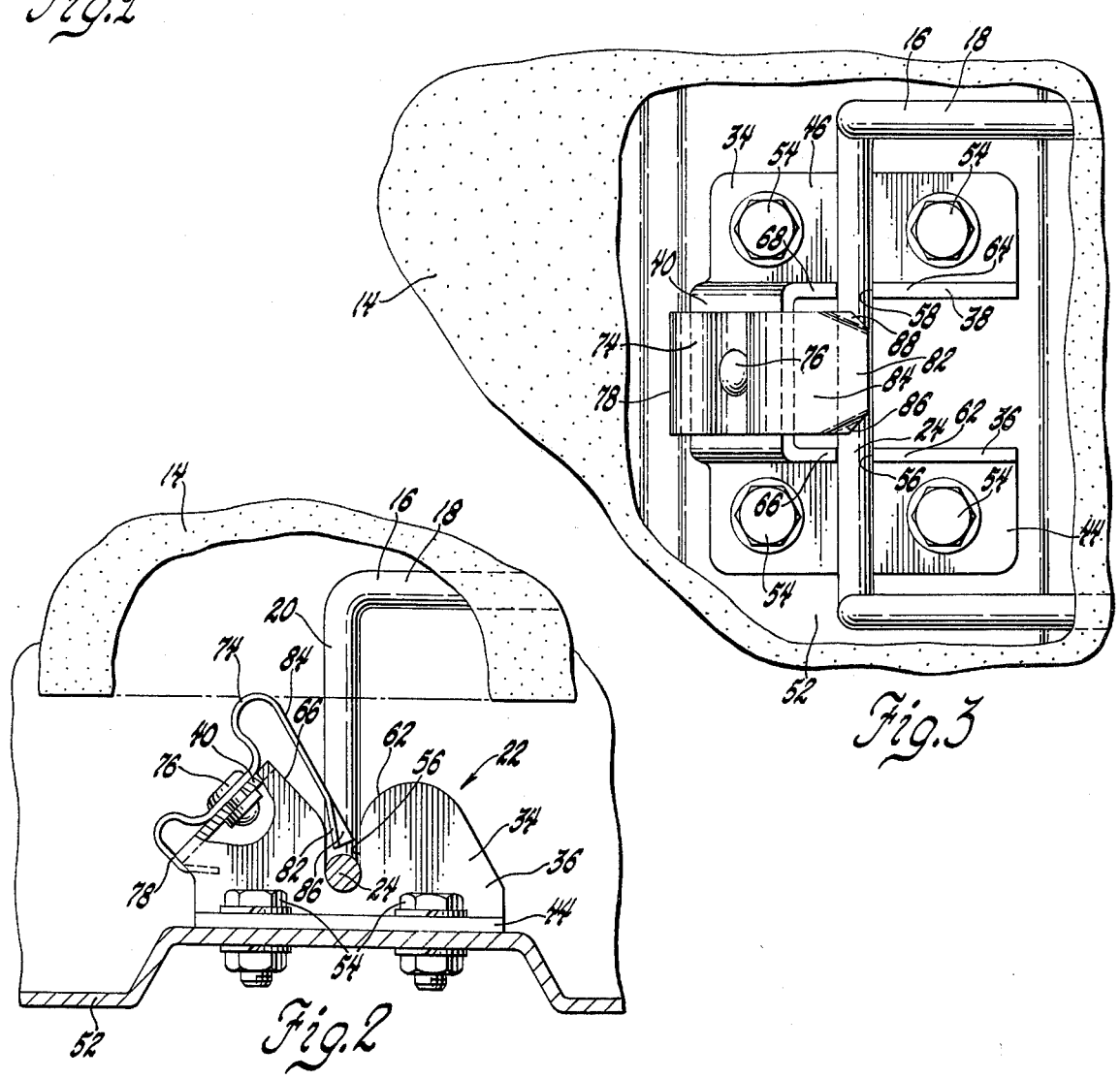

SEAT CUSHION RETAINER DEVICE

The invention relates to a retainer for attaching a seat cushion to the floor of a motor vehicle.

It is necessary in motor vehicles to provide a retaining device for mounting the frame of the seat cushion to the vehicle floor. It is desirable that such a seat cushion retainer prevent the seat cushion from becoming dislodged from the retainer during rapid vehicle acceleration or deceleration. Furthermore, it is desirable that such a seat cushion retainer permit removal of the seat cushion for maintenence or replacement purposes. It is also desirable that the seat cushion retainer allow ease of assembly or reinstallation of the vehicle seat in the motor vehicle body.

The present invention provides an improved retainer device for attaching the frame member of a seat cushion to the floor pan of a motor vehicle.

The retainer device includes a bracket which is preferably a steel stamping and includes laterally spaced upstanding legs which are connected by an integral bridging member extending between and connecting the upstanding legs at their forward upper ends. Integral mounting legs extend laterally and outwardly from the upstanding legs for attachment to the floor pan. An upwardly opening slot is provided in each of the upstanding legs and these slots are transversely aligned to receive a horizontally extending portion of the seat cushion frame member. The upstanding legs have lead-in cam surfaces diverging both forwardly and rearwardly of the slots to guide the frame member into the upwardly opening slots as the seat cushion is lowered onto the bracket. A leaf spring retainer has its one end mounted on the bridging member and its free end poised between the upstanding legs and generally transversely aligned with the upwardly opening slots. The portion of the leaf spring retainer intermediate the ends extends generally parallel to and above the lead-in cam surface adjacent the bridging member so that the intermediate portion of the leaf spring retainer is engaged by the seat cushion frame member as the seat cushion is lowered onto the bracket. The engagement of the seat cushion frame member with the leaf spring retainer flexes the free end of the leaf spring retainer out of transverse alignment with the upwardly opening slots so that the frame member can be fully lowered into the slots. The leaf spring retainer is self-biased back to its normal poised position in which it is positioned directly above the horizontally extending portion of the frame member to prevent the upward removal of the seat cushion. The width of the upwardly opening slots does not appreciably exceed the width of the frame member so that the seat cushion cannot accelerate relative the bracket. The corners of the free end of the leaf spring retainer are bent downwardly to effectively increase the extent of interference between the leaf spring retainer and the frame member upon attempted upward removal of the frame member. The frame member may be released from the retainer bracket by biasing the free end of the leaf spring retainer out of transverse alignment with the upwardly opening slots.

One feature of the invention is the provision of a retainer device for attaching a seat cushion to the floor pan of a motor vehicle which rigidly captures the seat cushion frame member to prevent fore and aft acceleration of the frame member relative the bracket and floor pan.

Another feature of the invention is the provision of a retainer device for a seat cushion which can be selectively released to permit removal of the cushion from the vehicle.

A still further feature of the invention is the provision of a seat cushion retainer device which permits the seat cushion to be easily snapped into attachment with the motor vehicle floor pan.

These and other objects, features and advantages of the invention will become apparent upon consideration of the specification and the appended drawings in which:

FIG. 1 is a side elevation view of a motor vehicle seat and the seat cushion retainer device;

FIG. 2 is an enlarged partial view of the seat cushion retainer device of FIG. 1; and FIG. 3 is a plan view of the seat cushion retainer device of FIG. 2.

Referring to FIG. 1, a vehicle seat 10 is shown including a seat back 12 and a seat cushion 14. The seat cushion 14 includes a frame member 16 which is a rod 18 generally following the perimeter of the cushion. The rod 18 is continuous and has downwardly bent integral legs 20 which provide a horizontally extending portion 24 as best seen in FIG. 3. As seen in FIG. 1 these downwardly bent integral legs 20 are provided along both the forward and rearward edges of the seat cushion. The rearward legs 20, of which there would preverably be at least two, spaced laterally of one another, are inserted into a hold-down bracket 28 which has a forwardly opening slot 30 for receiving the horizontally extending portion 24 of the frame member 16. The legs 20 at the forward end of the seat cushion are received in the laterally spaced retainer devices 22.

Referring to FIGS. 2 and 3 it will be seen that the retainer device 22 includes a stamped steel bracket 34. The bracket 34 includes laterally spaced upstanding legs 36 and 38. The upstanding legs 36 and 38 are integrally connected by a bridging member 40 which extends therebetween to connect the laterally spaced upstanding legs at their forward upper edges. Mounting legs 44 and 46 are respectively integral with the upstanding legs 36 and 38 and extend laterally and outwardly from the upstanding legs for attachment to the floor pan 52 of the motor vehicle as by bolts 54. An upwardly opening slot 56 is provided in the upstanding leg 36. A similar upwardly opening slot 58 is provided in the upstanding leg 38. The upwardly opening slots 56 and 58 are transversely aligned as shown in FIG. 3 for receiving the horizontal portion 24 of the frame member 16. The upstanding legs 36 and 38 have curved cam surfaces 62 and 64 diverging rearwardly from the slot 56 as well as cam surfaces 66 and 68 diverging forwardly from the slots 56 and 58. These cam surfaces guide the horizontal portion 24 into the slots 56 and 58 as the seat cushion is lowered onto the bracket 34. The width of the slots 56 and 58 does not appreciably exceed the diameter of the rod 18 of the frame member 16 so that the horizontal portion 24 is securely captured and cannot accelerate relative the bracket 34.

A leaf spring retainer 74 of spring steel is provided and has its one end attached to the bridging member 40 by a rivet 76. The end most portion 78 of the leaf spring retainer 74 is bent under the edge of the bridging member 40 to prevent the leaf spring retainer 74 from rotating on the rivet 76. The free end 82 of the spring steel retainer 74 is poised between the upstanding legs 36 and 38 and is generally transversely aligned with the upwardly opening slots 56 and 58. The body portion 84 of the leaf spring retainer 74 extends generally parallel to and above the cam surfaces 56 and 58 as viewed in FIG. 2 so as to be engaged by the horizontal portion 24 of the frame member 16 to flex the free end 82 of the spring steel retainer 74 out of transverse alignment with the upwardly opening slots 56 and 58 upon lowering of the frame member 16 into the slots. The corners 86 and 88 of the leaf spring retainer 74 are bent down as seen in FIGS. 2 and 3 so as to provide substantial interference against upward removal of the horizontal portion 24 of the frame member 16 from the upwardly opening slots 56 and 58.

In operation, as the seat cushion is lowered onto the floor pan, the horizontal portion 24 engages either the body portion 84 of the leaf spring retainer or the end 82 of the spring steel clip to flex the leaf spring retainer out of transverse alignment with the upwardly opening slots 56 and 58. The cam surfaces 62, 64, 66 and 68 permit blind lowering of the seat cushion onto the bracket by guiding the horizontal portion 24 into the upwardly opening slots 56 and 58. When the horizontal portion 24 engages the bottom of slots 56 and 58, the leaf spring retainer 74 is self-biased to its normal poised position of FIG. 2 in which it substantially interferes with upward removal of the frame member from the upwardly opening slots. The horizontal portion 24 cannot move fore and aft relative the bracket 34 because it is tightly captured in the slots 56 and 58.

The seat cushion can be selectively removed from attachment with the floor pan by use of a screwdriver or similar tool to manually flex the leaf spring retainer 74 from its poised position of substantial alignment with the transversely aligned slots 56 and 58.

Thus it is seen that an improved device is provided for attaching a seat cushion to the floor pan of a motor vehicle.

What is claimed is:

1. In a combination with a vehicle having a floor pan, a seat cushion, and a frame member in the seat cushion, a retainer device for attaching the seat cushion frame member to the floor pan comprising: a bracket attached to the floor pan and having a pair of laterally spaced upstanding legs, an upwardly opening slot in each of the upstanding legs, said slots being transversely aligned, lead-in cam surfaces on the upstanding legs diverging both forwarding and rearwardly of the slot to guide the blind lowering of the frame member into the upwardly opening slots, the upwardly opening slots being of only slightly greater width than the frame member so that the frame member cannot accelerate relative the bracket, a leaf spring retainer having one end mounted on the bracket and a free end poised between the upstanding legs and generally transversely aligned with the upwardly opening slots, the leaf spring retainer having a body portion intermediate the ends and extending generally parallel to and above one of the lead-in cam surfaces to be engaged by the seat cushion frame member to flex the free end of the leaf spring retainer out of transverse alignment with the upwardly opening slots upon lowering of the frame member into the slot, the free end of the leaf spring retainer being returned to the poised position by self-biased flexure of the leaf spring retainer to block upward removal of the frame member from the slots.

* * * * *